(12) United States Patent
Batman

(10) Patent No.: US 6,178,686 B1
(45) Date of Patent: Jan. 30, 2001

(54) LIVE ANIMAL TRAP

(76) Inventor: Darren Batman, 17503 Eleven Rd., Ingalls, KS (US) 67853

( * ) Notice: Under 35 U.S.C. 154(b), the term of this patent shall be extended for 0 days.

(21) Appl. No.: 09/232,312

(22) Filed: Jan. 15, 1999

(51) Int. Cl.[7] .................................................. A01M 23/18
(52) U.S. Cl. .................................................................. 43/61
(58) Field of Search .................................... 43/60, 61, 74

(56) References Cited

U.S. PATENT DOCUMENTS

| | | |
|---|---|---|
| 1,273,185 | 7/1918 | Reich . |
| 1,650,455 * | 11/1927 | Lewis ......................................... 43/61 |
| 2,524,423 | 10/1950 | Buford . |
| 2,608,018 * | 8/1952 | Tyler ......................................... 43/61 |
| 3,426,470 * | 2/1969 | Rudolph ................................... 43/61 |
| 3,729,852 * | 5/1973 | Holmes .................................... 43/61 |
| 3,823,504 * | 7/1974 | Dosch ....................................... 43/61 |
| 3,918,194 * | 11/1975 | Waske ...................................... 43/61 |
| 4,159,590 * | 7/1979 | Palfalvy .................................... 43/61 |
| 4,187,634 * | 2/1980 | Kintz ........................................ 43/61 |
| 4,452,004 | 6/1984 | Matsuura . |
| 4,554,758 * | 11/1985 | Molloy ..................................... 43/61 |
| 4,578,892 | 4/1986 | Melton . |
| 4,583,316 | 4/1986 | Holtgrefe . |
| 4,763,439 | 8/1988 | Smith . |
| 4,768,305 | 9/1988 | Sackett . |
| 4,829,700 | 5/1989 | Ha . |
| 5,005,312 * | 4/1991 | Lutes ......................................... 43/61 |
| 5,005,313 | 4/1991 | Lindros, Jr. . |
| 5,094,027 | 3/1992 | Smotherman . |
| 5,235,778 * | 8/1993 | Sutherlin ................................... 43/61 |
| 5,345,710 | 9/1994 | Bitz . |
| 5,615,515 | 4/1997 | Woodruff . |

* cited by examiner

Primary Examiner—Kurt Rowan
(74) Attorney, Agent, or Firm—Hovey, Williams, Timmons & Collins

(57) ABSTRACT

A live animal trap (20), having a trap wall (22), a closure mechanism (24), and a trip mechanism (26) is utilized to trap animals. The closure mechanism (24) includes a slicing closure door (56) which closes in a slicing direction (65) substantially perpendicular to an entry direction (67) into an internal chamber (28) defined by the trap wall (22). The trap wall (22) and the door (56) are substantially continuous to limit a trapped animals view thereby reducing agitation when the trap (20) is approached. The trap wall (22) is sized to inhibit a skunk from lifting its tail to spray.

2 Claims, 2 Drawing Sheets

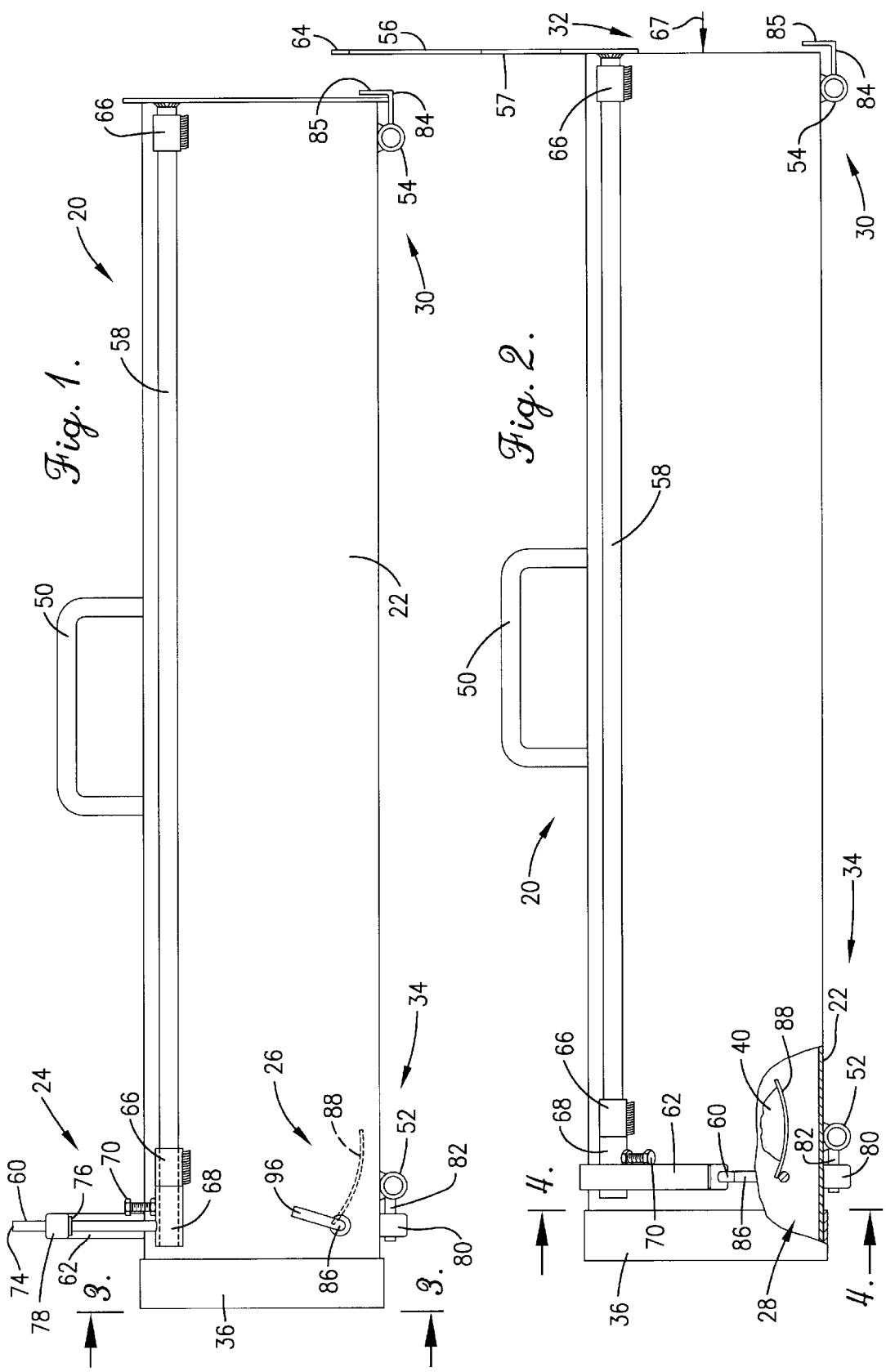

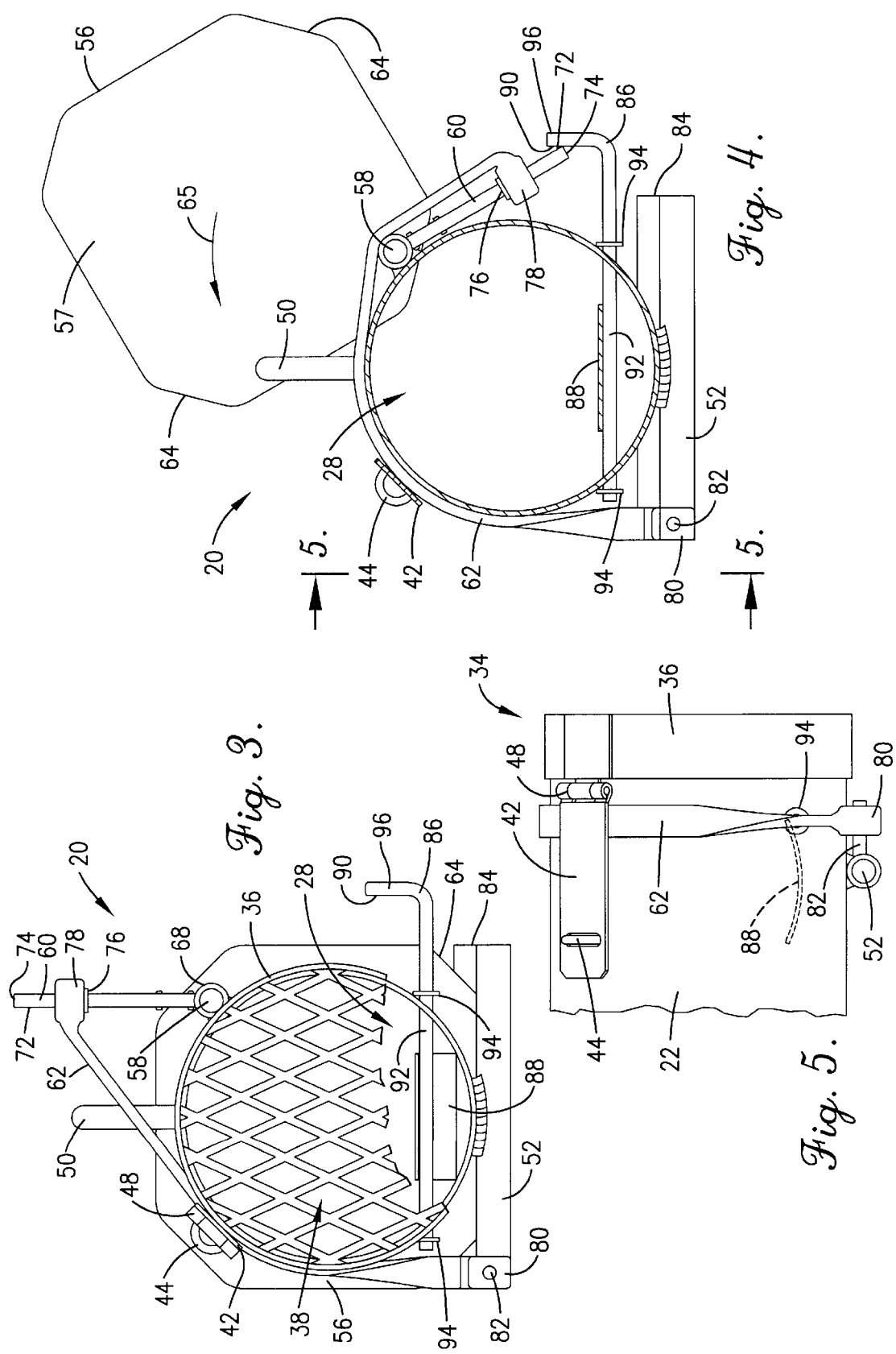

LIVE ANIMAL TRAP

BACKGROUND OF THE INVENTION

This invention relates to animal traps and, more particularly, to live animal traps for trapping and relocation of animals.

Individuals living in rural, agricultural, and newly developed areas are frequently confronted with wild animals such as foxes, beavers, badgers, possums, raccoons, and skunks. While these animals provide significant benefits in some circumstances and they are entertaining to observe, they can, on occasion, become a nuisance. At times their population becomes to great or their routine activities interfere with allocated land use. For example, a fox may be killing chickens or a raccoon raiding trash cans in a newly developed residential area, and no animals presences is as quickly detected as a skunk's. Skunks, because of their odor and ability to spray, can present an exceptional problem. When any of these animals interfere with land use, the most desirable option is trapping and relocation.

To that end, live animal traps have been provided which are generally capable of trapping these types of animals without causing them harm. However, these traps and their various designs have failed to fully appreciate the strength, determination, and industriousness of trapped animals, so that if the animal is not promptly relocated and released, the animal might injure itself, escape, or damage the trap to the extent that it is not reusable. These types of problems are frequently encountered because of the closure mechanisms used in traps, and while some traps have generally overcome these problems, they are typically of complex design and are too costly.

Further, trapping and relocating animals takes far more effort than simply destroying them. This is especially true for skunks and the accompanying smell and risk of being sprayed as well as bitten or scratched. Unfortunately, the choice to avoid this extra effort results in the unnecessary destruction of many animals. Again, current trap designs have failed to fully appreciate the need for convenience and safety. This deficiency is particularly problematic when trapping skunks. The traps are configured so that skunks can lift their tails and spray freely. Additionally, the traps typically do not restrict the animals view allowing the animal to see people thereby becoming increasingly agitated as they approach.

Thus, increasing the strength of live animal traps and improving live animal trap closure mechanisms is desirable to inhibit animal escape and injury and reduce the occurrences of damage to live animal traps. It is also desirable to configure live animal traps to limit a trapped animals view and so that skunks are not free to lift their tails to spray.

BRIEF SUMMARY OF THE INVENTION

There is, therefore, provided in the practice of the invention a novel live animal trap, which reliably traps animals without injury while inhibiting animal escape and which is less subject to damage. The trap includes a trap wall defining an internal chamber sized to receive an animal therein. The trap wall has an entrance opening, and a closure mechanism is provided which moves a closure door in a direction substantially transverse to an entry direction into the chamber to close the entrance opening. A trip mechanism is operably coupled with the closure mechanism to hold the door in the open position until an animal enters the trap.

In a preferred embodiment, the trap wall is preferably cylindrical and has an inside diameter selected to inhibit a skunk from lifting its tail to spray. A preferred diameter is approximately seven inches. The trap wall and closure door are substantially continuous to limit the trapped animal's view thereby decreasing agitation of the animal.

The closure door preferably extends beyond the perimeter of the entrance opening, and the closure mechanism has a door securement member which engages the closure door when it is in the closed position. The closure mechanism also includes a lever arm attached to an elongated pivot rod which extends substantially the entire length of the trap and is fixedly attached to the closure door. A biasing member is connected to the lever arm to bias the closure door toward the closed position. The lever arm includes a positioning plate to hold the biasing member in position on the lever arm. The lever arm has a rounded engagement surface which engages a trip arm engagement surface which is also rounded.

The present invention further contemplates the closure mechanism which is incorporated in the foregoing live animal trap. The closure mechanism includes a slicing closure door movable between an open position and a closed position to substantially close the entrance opening. The door slices closed moving in a direction substantially perpendicular to the entry direction into the trap.

Accordingly, it is an object of the present invention to provide an improved closure mechanism inhibiting animal escape from animal traps.

It is a further object of the present invention to provide an improved animal trap for limiting an animal's view.

It is a still further object of the present invention to provide an improved animal trap for inhibiting skunks from spraying.

It is another object of the present invention to provide an improved animal trap which is less vulnerable to damage.

BRIEF DESCRIPTION OF THE DRAWINGS

These and other inventive features, advantages, and objects will appear from the following Detailed Description of The Preferred Embodiments when considered in connection with the accompanying drawings in which similar reference characters denote similar elements throughout the several views and wherein:

FIG. 1 is a side elevational view of a live animal trap according to the present invention and shown in a closed position;

FIG. 2 is a side elevational view of the live animal trap of FIG. 1 shown in an open position and having a portion of a trap wall thereof removed for illustration;

FIG. 3 is a bait end view of the animal trap of FIG. 1 taken from the perspective of line 3—3 in FIG. 1 and having a portion of an end cap removed for illustration;

FIG. 4 is a transverse sectional view of the animal trap of FIG. 1 taken along line 4—4 in FIG. 2; and FIG. 5 is a fragmentary side view of the bait end of the live animal trap of FIG. 1 taken from the perspective of line 5—5 in FIG. 4.

DETAILED DESCRIPTION OF THE PREFERRED EMBODIMENTS

Referring to the drawings in greater detail, FIG. 1 shows a live animal trap 20 having a trap wall 22, a closure mechanism 24, and a trip mechanism 26. The trap 20 according to the present invention, which is preferably fabricated from a strong metal such as steel, utilizes bait 40

(FIG. 2) to draw animals into the trap 20 while the closure mechanism 24 and trip mechanism 26 operate to trap animals, one at a time, inside the trap wall 22.

Referring to FIGS. 1 through 3, the trap wall 22 is preferably continuous, elongated, and substantially cylindrical and defines an internal chamber 28 having a substantially constant diameter of approximately seven inches. The diameter is selected to permit entry of a skunk while inhibiting it from lifting its tail to spray while inside the internal chamber 28 of the trap 20. The internal chamber 28 extends over the entire length of the trap wall 22. The trap wall 22 has a closure end 30 defining an entrance opening 32 (FIG. 2). The entrance opening opens the internal chamber to the surrounding environment and is sized to permit entry of the animal desired to be trapped.

The trap wall also has a bait end 34 opposite the closure end 30. The bait end 34 is covered by a grated end cap 36. The end cap 36 is grated to define a plurality of scent transmission openings 38 which allow scent from bait 40 to exit the trap and attract animals. Referring additionally to FIG. 5, the end cap 36 is preferably removable and is clamped onto the trap wall 22 by a clamp arm 42 and lock loop 44. The clamp arm 42 includes a slot 46 for receiving the lock loop therethrough and is hingably connected to the end cap 36 by hinge 48, so that the clamp arm 42 can be pivoted in and out of engagement with the lock loop 44. A preferably cylindrical and tapered lock pin (not shown) or the clasp of a lock (not shown) is inserted through the lock loop 44 to hold the clamp arm in position and secure the end cap 36 to the bait end 34 of the trap wall 22. The end cap 36 is sized to fit snugly around the outside diameter of the trap wall and is sufficiently long to keep it from being forced off even though it is attached at only one point.

A handle 50 is positioned on top of the trap wall and is substantially centrally positioned along the length of the trap wall. A bait end leg 52 is attached, preferably welded, to the bottom of the trap wall and extends perpendicularly to the length of the trap wall. A closure end leg 54 is attached to the bottom of the trap wall adjacent to the closure end 30 and also extends perpendicular to the length of the trap wall. The bait end leg 52 is attached adjacent to the bait end 34 of the trap wall opposite the closure end leg 54.

Referring to FIGS. 1, 2, and 4, the closure mechanism 24 includes a closure door 56, a pivot rod 58, a lever arm 60, and a biasing member 62. The closure door 56 is substantially flat and is generally square having beveled corners 64 and a substantially smooth inner surface 57. The closure door 56 is juxtaposed to the closure end 30 and entrance opening 32 of the trap wall 22. The closure door has a perimeter which extends beyond the entrance opening, so that the closure door perimeter surrounds the entrance opening perimeter thereby substantially closing the entrance opening when the door is in the closed position. Thus, the closure door extends above, below, and to each side of the trap wall. The closure door is movable between open and closed positions in a slicing direction, illustrated by arrow 65, which is transverse, preferably substantially perpendicular, to the length of the trap wall 22 and an animal entry direction, illustrated by arrow 67.

The pivot rod 58 is attached to the closure door, preferably by welding, at its door end and near the center of one of the beveled corners 64. The pivot rod is pivotally attached, preferably by welds, to the trap wall by cylindrical collars 66 which are attached to the outer surface of the trap wall 22 adjacent to the top of the trap wall. The pivot rod is rotatably held in the collars 66. The pivot rod is elongated and has a lever end opposite the door end which is held in a lever collar 68 The lever collar 68 abuts one of the collars 66 and holds the pivot rod 58 therein. Further, the lever collar 68 is rotationally fixed to the pivot rod by a set screw 70.

The lever arm 60 is elongated and fixedly attached to the lever collar 68, so that it pivots with the pivot rod and the closure door. Thus, the lever arm, pivot rod, and door are rotationally connected, so that they rotate together. The lever arm extends radially away from the lever collar and preferably has a rounded outer surface including a rounded lever engagement surface 72 adjacent its distal end 74. The lever arm also includes a circular, biasing member positioning plate 76 located generally centrally along the length of the lever arm to position and properly tension the biasing member 62.

The biasing member 62 preferably comprises an elongated and elastic cord having an opening at a movable end 78 to receive the lever arm 60 therein. The movable end 78 of the cord slides down the lever arm 60 until it abuts the biasing member positioning plate 76. The biasing member 62 also includes a fixed end 80 having an opening to fit over a fixed biasing member mount pin 82 which is preferably rounded. The mount pin 82 is fixed relative to the trap wall, and it is preferably attached to the bait end leg 52 at an end of the leg 52. The mount pin 82 is positioned at a point around the circumference of the trap wall opposite to the position of the pivot rod. The biasing member is operative to bias the door toward the closed position, and the tension in the biasing member is sufficient to hold the door in the closed position.

The closure mechanism 24 also includes a securement member 84 fixedly mounted on the closure end leg 54 and positioned to engage the door in the closed position. The securement member 84 is elongated having a length approximately equal to the length of the closure end leg, and the securement member is substantially L-shaped extending forwardly toward the closure end and then upwardly in front of the entrance opening 32. There is only a small gap between the securement member and the entrance opening, so that the door has enough space to fit between the upright leg 85 of the securement member and the trap wall. If an animal trapped inside the trap pushes outwardly on the door, the door engages the upright leg 85 securement member 84, so that the door is difficult, if not impossible, to push open, even if the animal is strong enough to bend the door.

The trip mechanism 26 is operably coupled with the closure mechanism 24, specifically the lever arm 60, to hold the door 56 in the open position and release the door to the closed position when the trip mechanism 26 is tripped. The trip mechanism includes a trip arm 86 and a bait plate 88.

The trip arm 86 is preferably L-shaped having a round outer surface including a rounded trip engagement surface 90 which engages the lever arm engagement surface 72 to hold the closure door in the open position. The long leg 92 of the trip arm 86 rotatably extends through the trap wall into the internal chamber and back through the trap wall at a location substantially horizontally opposite to were it entered the internal chamber 28. A pair of positioning rings 94 are attached to the long leg 92 of the trip arm 86 just outside the trap wall to properly position the trip arm 86 and attached bait plate 88 inside the internal chamber. The short leg 96 of the trip arm 86 is positioned outside of the trap wall.

The bait plate 88 is attached to the long leg 92 of the trip arm 86 and is held inside the internal chamber 28. The bait plate 88 is attached to the long leg 92 along an edge, so that maximum tripping torque is applied to the trip arm by any force that an animal may apply to the bait plate while eating the bait. To hold a desired amount of bait, the bait plate is preferable arcuate and can further be cupped.

Referring to FIGS. 2 and 4, to set the trap, the end cap 36 is preferably removed and bait 40 is placed on the bait plate 88. The end cap 36 is then locked onto the bait end 34 of the trap wall 22 by locking the clamp arm 42 on the lock loop 44. The lever arm is then pivoted away from the mount pin 82 to a position adjacent the trap wall thereby placing maximum tension on the biasing member 62 as shown in FIGS. 1 and 3. The biasing member wraps more than half way around the circumference of the trap wall. The trip arm 86 is then rotated, so that the short leg 96 of the trip arm 86 is generally upright with the lever arm engagement surface releasably engaging the trip arm engagement surface to hold the door in the open position.

The scent of the bait then attracts an animal which enters the internal chamber 28 through the entrance opening 32 in the entry direction 67. When the animal takes the bait, the trip arm is rotated disengaging the rounded engagement surfaces of the trip arm and lever arm, so that the biasing member quickly pulls the door 56 closed in the slicing direction 65. The positioning of the pivot rod 58 and the beveled corners 64 of the door allow the door to move past the securement member 84 to the closed position. Because the perimeter of the door is beyond the perimeter of the entrance opening, the animal cannot reach the edge of the door with its claws, if it can turn around, to pull the door back open. Further, the biasing member is still under significant tension to hold the door closed. If the animal pushes outwardly on the door, the door engages the securement member 84 to keep the door from bending open.

When approaching the trap after an animal has been trapped, the trap is approached from the door side, so that the animal cannot see the individual thereby reducing agitation. Though the trap wall has a diameter sized to discourage a skunk from spraying, even if it does spray, the continuous trap wall and continuous door will deflect the spray.

The live animal trap 20 according to the present invention provides a reliable live animal trap which effectively traps animals without injury while inhibiting, if not preventing, escape and trap damage during attempted escapes. The trap 20 is also sized to inhibit skunks from spraying thereby making the responsible individuals task at least somewhat less unpleasant.

Thus, a live animal trap and slicing closure mechanism are disclosed which utilize a slicing door and an appropriately sized trap to trap animals with minimal escapes and risk of being sprayed by a skunk. While preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. An animal trap for trapping animals therein, the trap comprising:

a trap wall defining an internal chamber therein and an entrance opening to the chamber, the chamber being sized to receive an animal desired to be trapped and the entrance opening being sized to permit entry, in an entry direction, of the animal desired to be trapped, said trap wall including a closure end and a bait end opposite the closure end, the closure end defining the entrance opening in the trap wall;

a closure mechanism including:
a closure door movable in a slicing direction transverse to the entry direction, the closure door movable between an open position and a closed position substantially closing the entrance opening;
a lever arm positioned adjacent the bait end;
an elongated pivot rod having opposite ends and extending from the bait end to the closure end and being connected to the lever arm and closure door at the opposite ends;
a biasing member mount pin fixed relative to the trap wall and adjacent the lever arm; and
a biasing member connected to the mount pin and the lever arm to bias the closure door toward the closed position; and a trip mechanism operably coupled with the lever arm of the closure mechanism to hold the closure door in the open position and release the closure door to the closed position when the trip mechanism is tripped.

2. The trap according to claim 1, said trip mechanism comprising a generally L-shaped trip arm for releasably engaging the lever arm, the trip arm having a rounded trip arm engagement surface, and the lever arm having a rounded lever arm engagement surface engaging the trip arm engagement surface to hold the closure door in the open position against the biasing member.

* * * * *